June 20, 1950

L. JUY 2,511,985

ASSEMBLING AND DISMANTLING OF BICYCLE HUBS

Filed July 21, 1949

Lucien Juy
INVENTOR.

BY J. Delattre-Seguy
Attorney

Patented June 20, 1950

2,511,985

UNITED STATES PATENT OFFICE 2,511,985

ASSEMBLING AND DISMANTLING OF BICYCLE HUBS

Lucien Juy, Dijon-Cote-d'Or, France

Application July 21, 1949, Serial No. 106,053
In France July 22, 1948

3 Claims. (Cl. 74—242.14)

The systems for tightening and loosening bicycle hubs and the like as practised to-day include either a set of hexagonal or winged nuts located on each side of the hub, or a pin system, with a hollow spindle or a spindle in two portions.

There is an obvious improvement to form an arrangement that enables the tightening-up and slacking-off to be performed in a single handling, such an arrangement being fitted on present hubs without replacing the spindle or providing it with a pin, which allows it to retain all its original sturdiness. The improved device on the other hand takes up less room than a winged nut of standard pattern on the side of the chain transmission and the speed change gear so that the assembly and dismantling is simplified, thus making the operation a much quicker job.

This device forms the object of my invention.

It may be carried out in the following way given out as a non-restrictive example illustrated in accompanying drawings.

Figure 1:
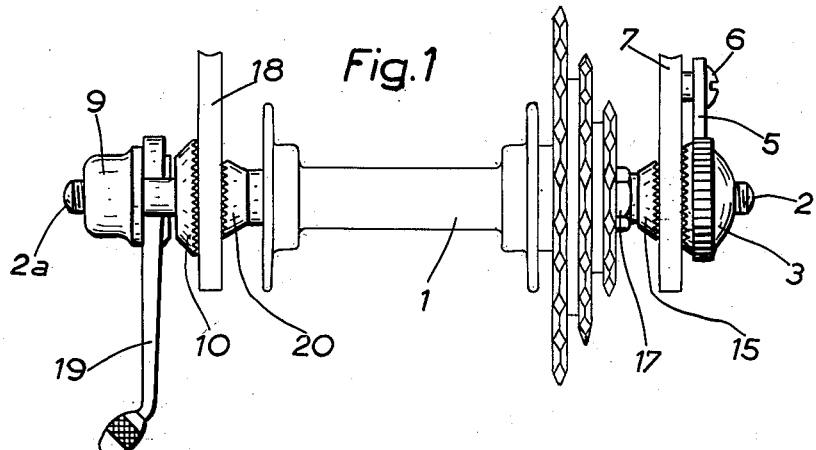
Fig. 1 is a general view thereof.

On a hub of standard pattern 1 (Fig. 1) furnished with its normal spindle 2—2a is screwed a collar 3.

Figure 4:
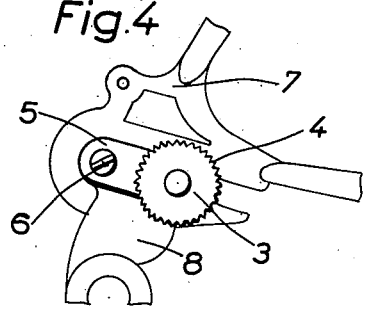

This collar 3 is furnished with notches or flats 4 that engage, when the hub is in position, a check member of corresponding shape 5 (Fig. 4). This member 5 may be removable and fastened by a screw 6 on to the frame bracket 7 or be built in one, either with the frame bracket 7, the supporting bracket for the derailleur gear 8 or any other auxiliary.

Figure 2:
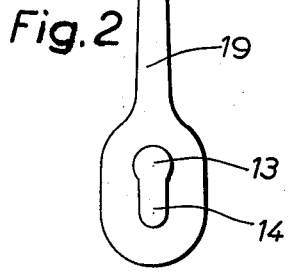
Figs. 2 to 5 are detail views.
Figure 3:
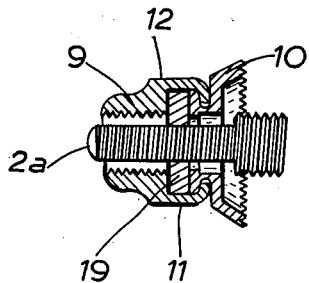

Furthermore, a collar 9 is secured on the spindle end 2a (Fig. 3). This collar 9 is mechanically connected with a contact ring 10 by two flanges 11 and 12. These two flanges may be built in one with the collar 9 or be fitted thereto by some standard means such as screw, rivet, welding, etc., and encase the ring 10 so as to hold it sideways, without preventing the parts 9 and 10 from turning in relation to each other. Between the ring 10 and the collar 9 is located the control lever 19 that assumes the special shape shown in Fig. 2.

This lever 19 has a suitably shaped hole drilled through it so as to enable it either to turn freely on the spindle 2a when the spindle is in the part 13 of the hole, or to drive this spindle through one or more flat parts set up on the spindle 2a when the latter slides into the part 14.

Figure 5:
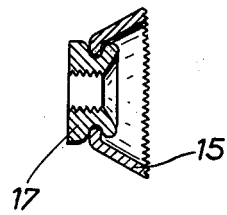

The spindle 2 (Fig. 1) may be furnished with a contact ring 15 held by setting in a shoulder of suitable shape arranged in the lock nut 17 (Fig. 5) to be found on normal hubs. If the pattern of hub in question is not provided normally with this lock nut 17, it is obvious that such a nut may always be fitted on the thread of spindle 2 through a subsequent operation.

The ring 15 enables the spindle 2 to swing easily round its axis without causing any jamming of the lock nut 17, when tightening up on the bracket 7.

The working procedure is as follows:

With the collars 3 and 9 slacked off by a few turns, the hub is engaged in its normal position in the frame brackets 7 and 18. At this time (Fig. 4) the collar 3 coming into contact with the check member 5 is held against rotation round its axis, the lever 19 being then positioned so that the part 14 engages two corresponding flat portions of the spindle (on the end 2a); any rotation of the lever 19 will have the effect of causing the spindle 2—2a to turn and will result in the clamping of the frame bracket 7 between the collar 3 and the ring 15. When the clamping is effected, an axial motion of the lever 19 will bring the spindle 2a into the part 13 (Fig. 2).

By keeping on rotating the lever 19 in the same direction, the spindle 2a will not be subjected to any movement of rotation but the lever will transmit motion to the collar 9. The latter by screwing up on the spindle 2a will press the portion 13 of the lever and the ring 10 on the one hand against the collar 20 on the other hand, for clamping between said parts the frame bracket 18. The hub 1 is therefore, at this particular instant, fastened in the brackets 7 and 18 by the operation of a single hand-lever 19.

For slacking off, the procedure takes place in the reverse direction.

The rotary movement (the reverse of the previous case) of the lever 19 unscrews the collar 9 by several turns. By allowing the lever 19 to slide so as to bring its portion 14 on the flat parts of the spindle 2a and carrying on turning in the same direction, the unclamping of the collar 3 from the side of the bracket 7 is obtained.

It is evident that the various collars, rings or levers may be executed to the standard dimensions of the present hubs, that if the standard spindle is not provided with the flat parts indicated on the end 2a (Fig. 1) it is easy to form them on any present spindle and that each of these parts may be carried out with rounded-off edges, grooves, notches, intended to simplify engagement, contact and working generally, without introducing any new feature thereby in the invention defined in accompanying claims.

In the same way, they may be carried out, with the object of reducing weight, with special dimensions with or without the spindle being likewise specially machined, the working principle remaining of course the same.

My invention, therefore, is not limited to the above-mentioned example of execution, but takes in all modifications thereof falling within the scope of accompanying claims.

What I claim is:

1. A hub arrangement chiefly for association with bicycle frames comprising two lugs rigid with the frame, a spindle revolubly carried by said lugs, a hub fitted over said spindle between the two lugs, a nut-shaped member screwed over either end of the spindle, a washer rotatably engaging the inner end of each nut on one side and frictionally engaging the cooperating frame lug on the other, one nut-shaped member being provided with an elongated recess across the spindle axis, a lever the inner end of which fits permanently and slidingly inside said recess for constraining the nut-shaped part to rotate in unison with the lever round the spindle, said lever being provided at its inner end with an elongated longitudinal slot opening into a larger hole, the elongated slot fitting for a predetermined longitudinal position of the lever over the spindle for allowing simultaneous rotation of the spindle and corresponding nut-shaped member under the action of the lever, the lever engaging the hole for another position for releasing the spindle, and means for normally preventing rotation of the nut-shaped member on the side opposed to the lever.

2. A hub arrangement chiefly for association with bicycle frames comprising two lugs rigid with the frame, a spindle revolubly carried by said lugs, a hub fitted over said spindle between the two lugs, a nut-shaped member screwed over either end of the spindle and frictionally engaging the cooperating frame lug, a shiftable lever engaging positively and permanently one nut-shaped member and adapted to engage also positively the spindle for a predetermined position of said lever and to release same for another position thereof and means for normally preventing rotation of the nut-shaped member on the side opposed to the lever.

3. A hub arrangement chiefly for association with bicycle frames comprising two lugs rigid with the frame, a spindle revolubly carried by said lugs, a hub fitted over said spindle between the two lugs, a nut-shaped member screwed over either end of the spindle, a washer rotatably engaging the inner end of each nut on one side and frictionally engaging the cooperating frame lug on the other, a shiftable lever engaging positively and permanently one nut-shaped member and adapted to engage also positively the spindle for a predetermined position of said lever and to release same for another position thereof and means for normally preventing rotation of the nut-shaped member on the side opposed to the lever.

LUCIEN JUY.

No references cited.